United States Patent [19]

Crump et al.

[11] Patent Number: 5,115,850

[45] Date of Patent: May 26, 1992

[54] TREAD WITH IMPROVED GROOVE DESIGN

[75] Inventors: Robert L. Crump, Cumberland, Md.; Ronald T. Harris, Greenspring, W. Va.; Samuel E. Reckley, LaVale; Edward L. Montgomery, Cumberland, both of Md.; Lawrence B. Hurst, North Canton, Ohio

[73] Assignee: The Goodyear Tire & Rubber Company, Akron, Ohio

[21] Appl. No.: 656,921

[22] Filed: Feb. 19, 1991

[51] Int. Cl.⁵ .............................................. B60C 11/03
[52] U.S. Cl. ...................... 152/209 R; 152/DIG. 1
[58] Field of Search .......... 152/209 R, 209 D, DIG. 1

[56] References Cited

U.S. PATENT DOCUMENTS

| 2,265,543 | 12/1941 | Overman | 152/DIG. 1 |
| 3,682,220 | 8/1972 | Verdier | 152/209 R |
| 3,727,661 | 4/1973 | Hoke | 152/209 R |

FOREIGN PATENT DOCUMENTS

| 0227322 | 7/1987 | European Pat. Off. | 152/209 R |
| 0004610 | 1/1987 | Japan | 152/209 R |
| 0194908 | 8/1987 | Japan | 152/209 D |
| 0297108 | 12/1988 | Japan | 152/209 R |

Primary Examiner—Michael W. Ball
Assistant Examiner—Nancy T. Krawczyk
Attorney, Agent, or Firm—Bruce J. Hendricks

[57] ABSTRACT

An improved tire tread having a net-to-gross ratio greater than 50% and a plurality of grooves defined by a base spaced between road contacting ribs is described herein. The improved tread is characterized by at least one circumferentially extending radially deep groove having a circumferentially continuous projection in the base of the groove.

The projection has height measured from the base of the groove radially outward of less than one-sixth of the depth of the groove. The projection has a thickness of greater than one-half the height of the projection. The projection is axially spaced from the adjacent road contacting ribs. The projection is connected to the adjacent ribs by a plurality of braces. The braces are of substantially the same height as the projection. Each brace is spaced circumferentially from adjacent braces and connected to both sidewalls of the circumferentially extending adjacent ribs.

13 Claims, 4 Drawing Sheets

TREAD WITH IMPROVED GROOVE DESIGN

BACKGROUND OF THE INVENTION

This invention relates to an improvement in pneumatic tire tread design. Specifically the improvement relates to an improved circumferential groove designed for tire treads. The invention applies to new tires and replacement treads employing such circumferential grooves. The design is particularly well suited for rib truck tires with circumferential grooves. The groove improvement provides limited protection to the base of such grooves from stone penetration and further reduces the occurrence of stone pickup and retention.

The rubber treads of pneumatic tires are commonly provided with one or more transversely spaced circumferentially continuous anti-skid grooves to increase the traction properties of the tire. These grooves are generally straight or zig-zag.

The spaced grooves define solid ribs, rib lugs or rib blocks of the road-contacting surface of the tire. The grooves extend radially inward from the ground contacting surface to a base, the base of the groove extending between the walls of adjacent ribs or blocks.

The grooves of such tires permit foreign objects such as stones to be picked up and retained. Occasionally a stone or other sharp object can be held or trapped by the sidewalls of the ribs. Such stones can be forced into contact with the base of the groove potentially cutting or penetrating the base of the groove. If the penetration is deep enough the wire reinforcements in the breaker or belt structure of the tire can be exposed. Such exposure can lead to oxidation or rusting of the metallic wire thus weakening the structure.

A second common problem is distinguishing between cuts in the base of a groove and surface cracks relating to ozone degradation. This is important because a cut in the thin rubber base of a groove can expose the reinforcing wire to oxidation. The oxidation weakens the wire and can result in premature failure due to wire breakage. Ozone surface cracks create surface blemishes that look similar to cuts but are not deep enough to expose the wire reinforcement.

Solutions to rocks penetrating a base of grooves have been attempted in the past.

A pneumatic tire with transverse crossbars or butresses is described in U.S. Pat. No. 3,706,334 granted Dec. 19, 1972.

A pneumatic tire with a rib occupying the majority of the base of a groove is described in French Patent 1,163,341.

Previous attempts to protect the base of the circumferential groove from rock penetration relied on rather large projections that occupied a high percentage of the groove void area. Such designs reduce the amount of water that the groove could accommodate resulting in a reduction of wet traction characteristics.

The invention described herein provides an effective stone penetration barrier while minimizing the amount of space used to provide such protection. Also the barrier is uniquely designed to give a visual indication of occurrences of rock penetration damage in the area of the base of the groove. The barrier design further enables one to distinguish surface ozone cracking from a deeper crack caused by rock penetration.

SUMMARY OF THE INVENTION

This invention relates to an improved tire tread having a net-to-gross ratio greater than 50% and a plurality of grooves. The tread when circumferentially mounted on a tire carcass has at least one circumferentially continuous groove defined by a base extending between road-contacting ribs. The improved tread is characterized by a circumferentially continuous projection in the base of the groove. The projection has a height measured from the base of the groove radially outward of less than one-sixth the depth of the groove. The thickness of the projection is greater than one-half the height. The projection is axially spaced from the adjacent road-contacting ribs and is connected to the ribs by a plurality of braces. The braces are substantially the same height as the projection and are circumferentially spaced from the adjacent braces and connected to both sidewalls of the circumferentially extending adjacent ribs.

DETAILED DESCRIPTION OF THE PREFERRED EMBODIMENT

Figure 1:
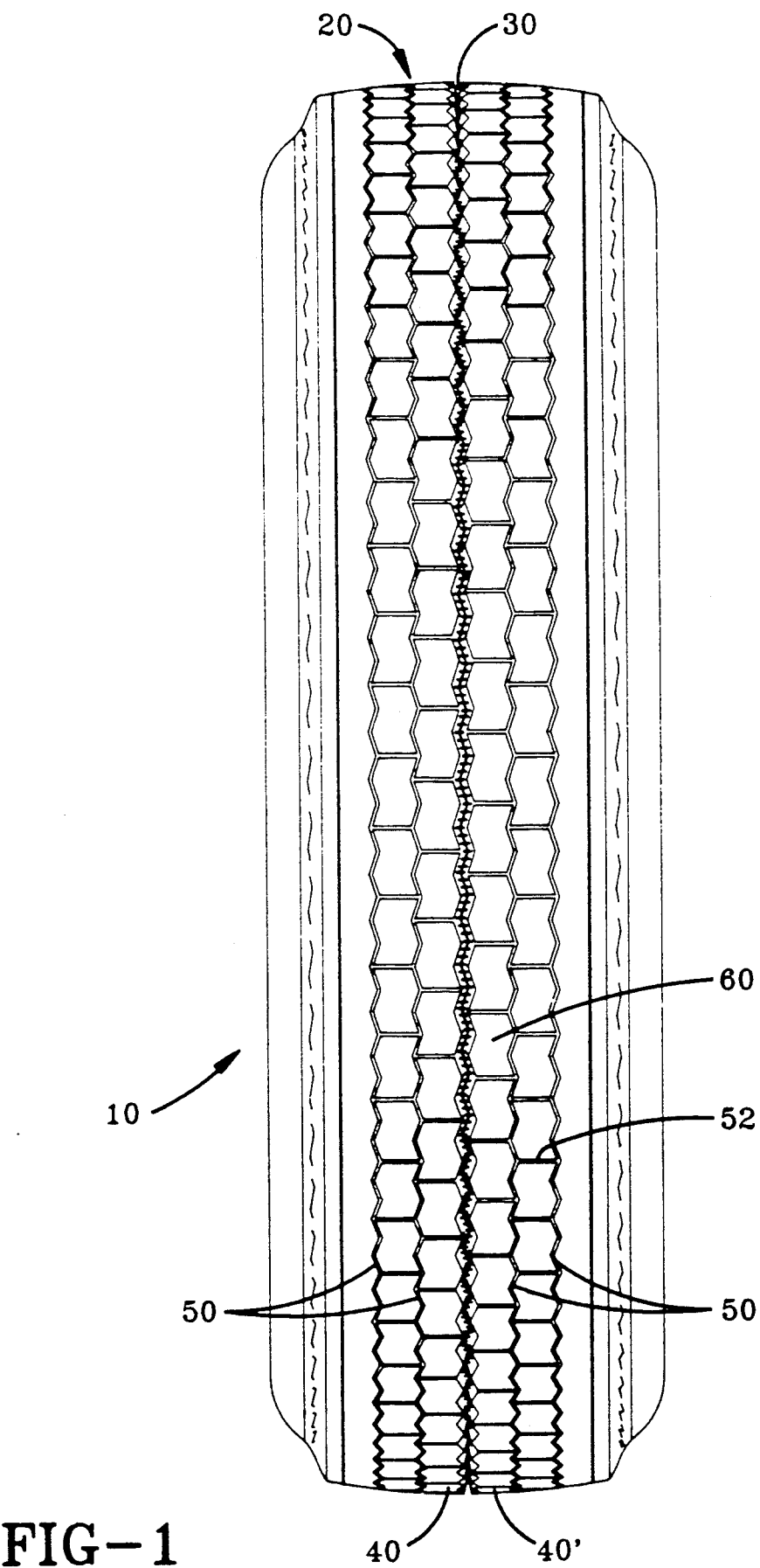
FIG. 1 illustrates a plan view of a tire with the improved tread.

The invention also may be better understood in the context of the following definitions which are applicable to both the specification and to the appended claims.

"Aspect ratio" of the tire means the ratio of section height to section width.

"Axial" or "axially" are used herein to refer to lines or directions that are parallel to the axis of rotation of the tire.

"Chipping" as used herein means a loss of small pieces of tire due to rough terrain: example, off-road.

"Compensated tread width" means the tread width multiplied by the aspect ratio.

"Circumferentially" as used herein means a plane parallel to the equatorial plane.

"Equatorial Plane (EP)" means the plane perpendicular to the tire's axis of rotation passing through the center of its tread.

"Footprint" means the contact patch or area of contact of the tire tread with a flat surface at zero speed under normal load and pressure.

"Groove" means an elongated void area in a tread that may extend circumferentially or laterally about the tread in a straight, curved, or zig-zag manner.

Circumferentially and laterally extending grooves sometimes have common portions and may be subclassified as "wide", "narrow", or "slot". The slot typically is formed in a tread by steel blades inserted into a cast or machined mold.

A "slot" is a groove having a width in the range from about 0.2% to 0.8% of the compensated tread width, whereas a "narrow groove" has a width in the range of about 0.8% to 3% of the compensated tread width and a wide groove has a width greater than 3% thereof.

The "groove width" is equal to the tread surface area occupied by a groove or a groove portion, the width of which is its average width over its length. Grooves, as well as other voids, reduce the stiffness of the tread regions in which they are located. Slots are often used for this purpose, as are laterally extending narrow or wide grooves. Grooves may be of varying depths in a tire. The depths of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Net-to-gross ratio" means the ratio of the area of the tire tread which normally makes contact with a paved road surface while in the footprint, divided by the area of the tread in the footprint, including non-contacting portions such as the inner tread surface.

"Radial" and "radially" are used to mean directions radially toward or away from the axis of rotation of the tire.

"Rib" means a circumferentially extending strip of rubber on the tread which is defined by at least one circumferential "wide groove" and either a second such groove or a lateral edge of the tread, the strip of rubber being laterally undivided by fold depth narrow or wide grooves. As used herein a rib may be defined to include solid ribs the rib-lug type, the rib-block type.

"Section height" means the radial distance from the nominal rim diameter to the maximum outer diameter of the tire at the road-contact surface nearest its equatorial plane.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tread" means that portion of a tire that comes in contact with the road when the tire is normally inflated and under normal road.

"Tread width" means the arc length of the tread surface in the axial direction, that is, in a plane passing through the axis of rotation of the tire.

With reference to FIG. 1 a tire shown generally at 10 is provided with a tread shown generally at 20. The tread has a circumferentially continuous groove 30 spaced between ground contacting ribs 40, and 40' and a plurality of narrow grooves 50, and groove segments 52 spaced between ground contacting tread blocks 60. The illustrated tread pattern is of the rib-block type configuration.

Figure 2:
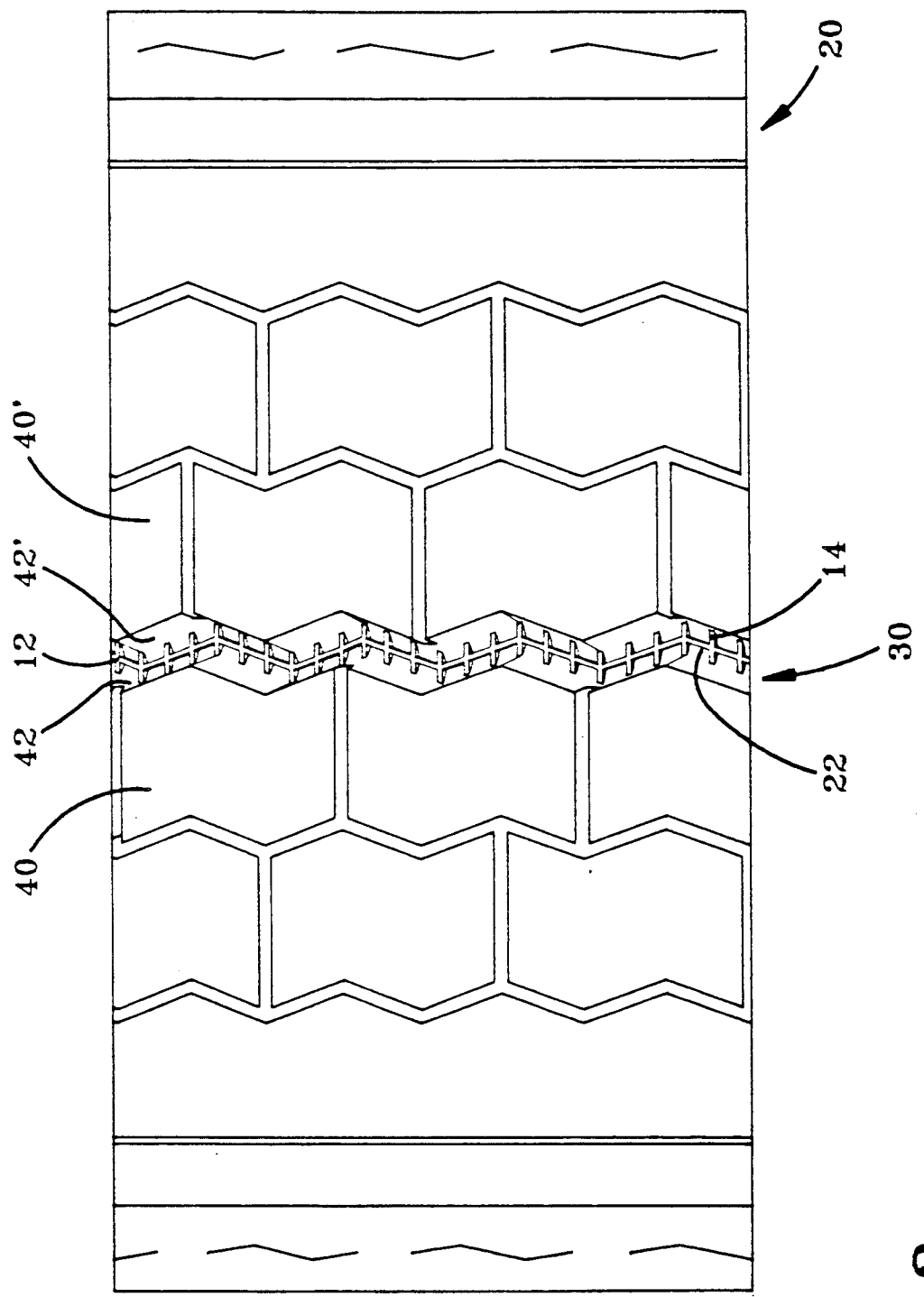
FIG. 2 illustrates a plan view of a portion of the tread having a circumferential groove with projection and bracing.

FIG. 2 is an enlarged planned view of a portion of the tread 20 illustrating the circumferentially continuous groove 30 located in the center of the tread. The groove has a circumferentially continuous projection 12 shown in the base of the groove. The projection 12 is approximately axially centered in the base 22 of the grooves 30 and spaced equidistant from the walls 42,42' of the adjacent ribs. A plurality of axially extending braces 14 are shown. The braces traversed the projection 12 and extend therefrom connecting with the walls 42, 42' of the adjacent ribs 40, 40'.

Figure 3:
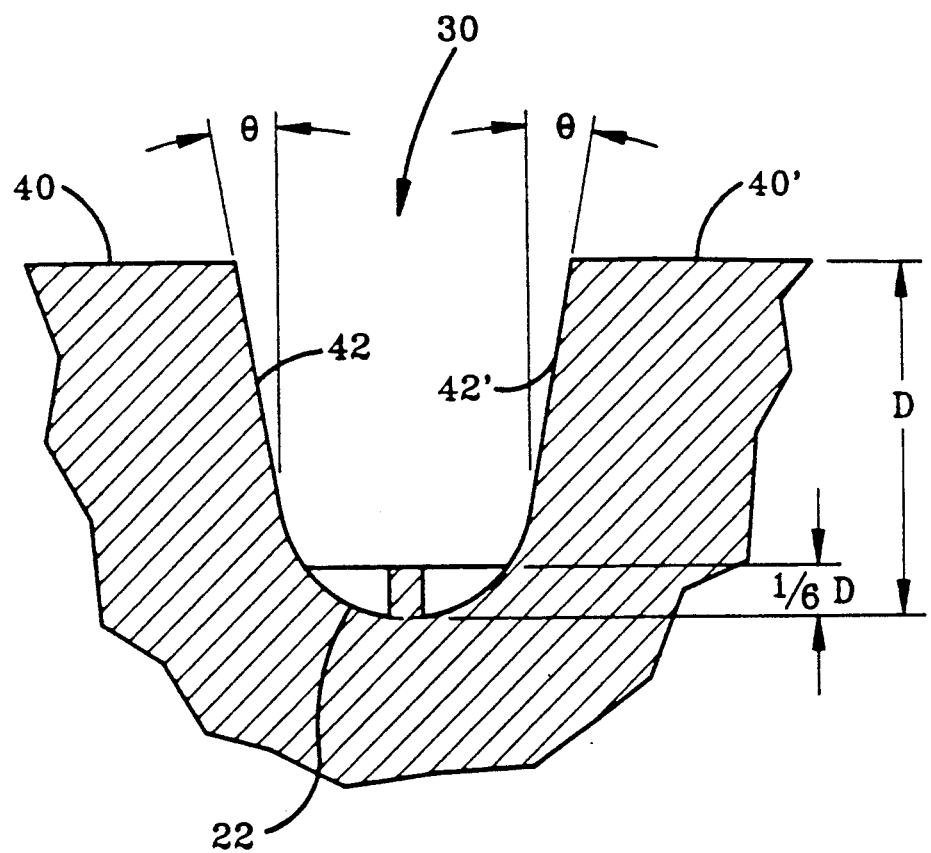
FIG. 3 is an enlarged cross-sectional view of the groove taken along lines 33 of FIG. 2.

In FIG. 3 an enlarged cross-sectional view of the groove 30 with a projection 12 and base 22 is illustrated. The projection 12 is axially centered in the base of the groove 30 and axially extends outwardly from the base of the groove a distance of less than one-sixth the overall depth D of the groove 30. The bracing 14 as illustrated has a radial height equal to the projection.

In the preferred embodiment the thickness of the projection 12 is about two-thirds the projection height at the center of the groove 30. It is recommended that the thickness be in a range of 0.2% to 0.8% of the compensated tread width. The bracing 14 has a thickness approximately equal to the thickness of the projection 12. The preferred thickness is about 0.67% of the tire's compensated tread width.

A truck tire according to the present invention was made in a 285/75 R245 size tire. The base of the groove was a full 3.9 mm radius contour that extended to the walls of the adjacent ribs. The walls were each inclined at a 10° slope outwardly from the groove base. The groove depth D was 10.7 mm. The groove included a projection with a 1.5 mm height and a 1.0 mm thickness and bracing of the same height and thickness as the projection. The braces were approximately equally spaced at a distance of less than 6.4 mm. The tire had tread width of about 20 cm, an aspect ratio of 75%, and a compensated tread width of 15 cm. The thickness of the projection and the braces was 0.5% of the actual tread width or 0.67% of the compensated tread width.

Figure 4A:
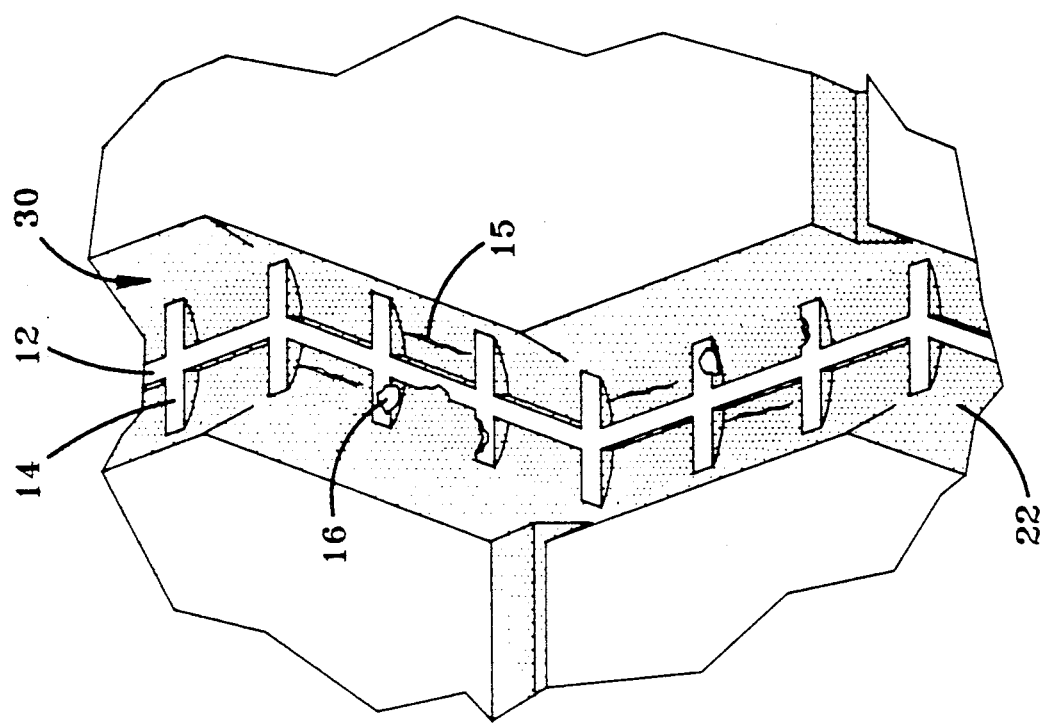
FIG. 4A is an enlarged view of a portion of the tread of FIGS. 1-3, the tread groove having damage from rocks distinguished from ozone cracks.
Figure 4:
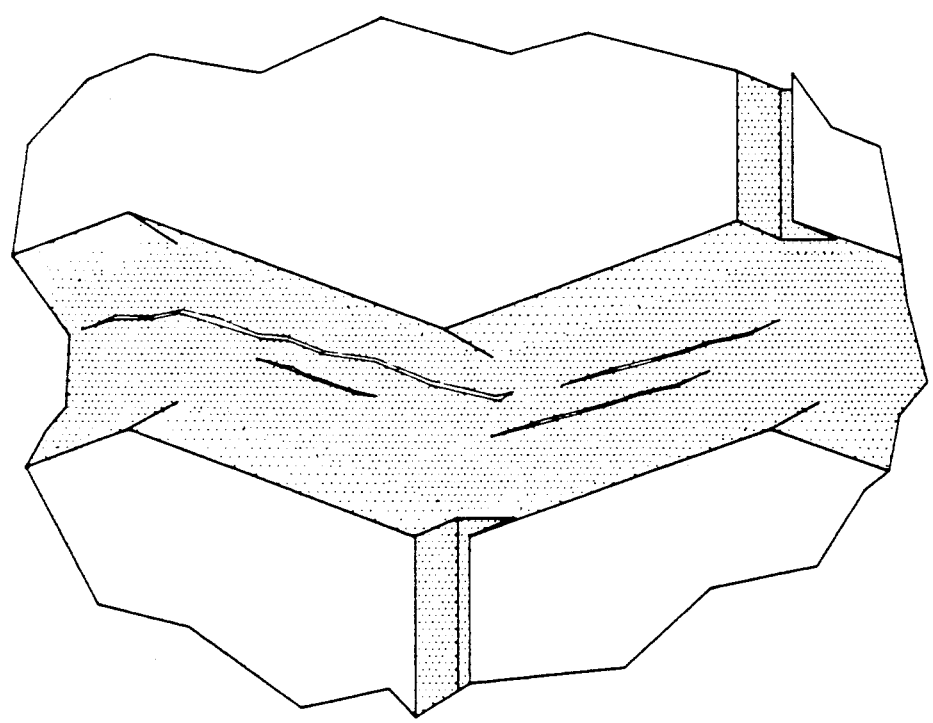
FIG. 4 is a view of a portion of a prior art tread.

FIG. 4 illustrates a typical groove of a tread, the base of the groove exhibiting a plurality of cracks or fissures. Commonly truck tires can exhibit such surface cracking in the base of the tread groove as a result of environmental exposure to ozone or as a result of sharp objects penetrating the surface. Ozone surface cracking although undesirable generally will not affect the tire reinforcing structure. Penetration by sharp objects on the other hand may expose the wire reinforcement. Such exposure could lead to oxidation of the metal surface and ultimately wire failure.

Truck tires are routinely inspected for damage. It is very difficult in many cases to distinguish a harmless ozone surface blemish from a more serious sharp object penetration crack.

In FIG. 4A an enlarged portion of a groove 30 having a projection 12 and braces 14 located in the base 22 of the groove 30 is illustrated. The figure illustrates that when ozone cracking 15 occurs, its migration in the base of the groove is limited to the space between braces 14. The braces 14 tend to provide an irregularity in the surface that reinforces the surface inhibiting the growth of the fissure. Alternatively when a sharp object such as a stone penetrates the base 22 of the groove 30 the projection 12 and bracing 14 will generally absorb the impact first and will in most cases protect the base 22 of the groove 30. In those cases where the penetration is deep the projection 12 and bracing 14 may locally chip as shown at 16 leaving a visual indication of object penetration.

The design of the projection is intended to be a minimal obstruction in the void area of the groove. The design provides limited protection from sharp objects for the thin inner tread area directly radially inward of the base of the groove. The projection 12 and bracing 14 are of a geometric shape and size intended to locally chip in the event of a deep rock or stone penetration. This localized chipping yields a more visually observable means to detect a serious rock or stone penetration into the base of the groove.

Alternative embodiments of the above described invention may include having the bracing perpendicular to the groove, perpendicular to the projection, or any combination thereof or any angularly oriented bracing. The bracing may be spaced apart a distance of less than one inch. In the preferred embodiment the spacing was less than 6.4 mm. The height of the projection preferably should be within a range of 1.0 to 0.5 mm. The thickness of the projection preferably is less than three/fourths the radial height of the projection. In the preferred embodiment the thickness is two/thirds of the height of the projection. The height and thickness may be varied according to the design of the tread configuration.

What is claimed is:

1. An improved tire tread having a net-to-gross ratio greater than 50% and a plurality of grooves defined by a road contacting ribs, the improvement being characterized by the tread when circumferentially mounted on a tire carcass having:

at least one circumferentially extending radially deep groove having a circumferentially continuous projection in the base of the groove, the projection having a height, measured from the base of the groove radially outward, of less than 1/6 the depth of the groove and having a thickness of greater than one-half the height of the projection, the projection being axially spaced from the adjacent road contacting ribs and connected to the adjacent ribs by a plurality of braces, the braces being of substantially the same height as the projection, each brace being spaced circumferentially from adjacent braces and connected to both sidewalls of the circumferentially extending adjacent ribs.

2. The tread of claim 1, wherein the bracing is perpendicular to the projection.

3. The tread of claim 1, wherein the bracing is perpendicular to the circumferential direction of the tread.

4. The tread of claim 1 wherein the bracing has a circumferential thickness substantially equal to the thickness of the projection.

5. The improved tread of claim 1, wherein the plurality of braces are equally circumferentially spaced a distance less than 25.4 mm.

6. The improved tread of claim 1, wherein the circumferentially continuous projection is axially centered in the base of the groove.

7. The improved tread of claim 5, wherein the braces are circumferentially spaced at about 6.4 mm.

8. The improved tread of claim 4, wherein the thickness of the projection is less than three/fourths the radial height of the projection.

9. The improved tread of claim 1, wherein the radial height of the projection is less than 2.5 mm and greater than 1.0 mm.

10. The improved tread of claim 1, the tread having a compensated tread width and wherein the thickness of the projection is in the range of 0.2% to 0.8% of the compensated tread width.

11. An improved pneumatic tire having a tread with a net-to-gross ratio greater than 50% and a plurality of grooves defined by a base spaced between road contacting ribs, the improvement characterized by:

at least one circumferentially extending radially deep groove having a circumferentially continuous projection in the base of the groove, the projection having a height measured from the base of the groove radially outward of less than 1/6 the depth of the groove and having a thickness of greater than one-half the height of the projection, the projection being axially spaced from the adjacent road contacting ribs and connect to the adjacent ribs by a plurality of braces, the braces being of substantially the same height as the projection, each brace being spaced circumferentially from adjacent braces and connected to both sidewalls of the circumferentially extending adjacent ribs.

12. The tread of claim 1 wherein at least one of the grooves, having a circumferentially continuous projections, is straight.

13. The tread of claim 1 wherein at least one of the grooves having a circumferentially continuous projection is a zig-zag groove.

* * * * *